United States Patent
Johansson (10) Patent No.: US 12,162,534 B2
(45) Date of Patent: Dec. 10, 2024

(54) LOW-SPEED MANEUVERING ASSISTANT FOR A VEHICLE

(71) Applicant: Volvo Truck Corporation, Gothenburg (SE)

(72) Inventor: Daniel Johansson, Gothenburg (SE)

(73) Assignee: Volvo Truck Corporation, Gothenburg (SE)

(*) Notice: Subject to any disclaimer, the term of this patent is extended or adjusted under 35 U.S.C. 154(b) by 382 days.

(21) Appl. No.: 17/667,877

(22) Filed: Feb. 9, 2022

(65) Prior Publication Data

US 2022/0274644 A1    Sep. 1, 2022

(30) Foreign Application Priority Data

Mar. 1, 2021    (EP) ..................................... 21160007

(51) Int. Cl.
    *B62D 13/06*      (2006.01)
    *B60R 1/26*      (2022.01)
    (Continued)

(52) U.S. Cl.
    CPC ................ *B62D 13/06* (2013.01); *B60R 1/26* (2022.01); *B60W 30/18036* (2013.01);
    (Continued)

(58) Field of Classification Search
    CPC .... B62D 13/06; B60R 1/26; B60W 30/18036; B60W 60/001; B60W 2300/145;
    (Continued)

(56) References Cited

U.S. PATENT DOCUMENTS 6,816,804 B1 * 11/2004 Lee ..................... B60W 40/105
                                                  701/72
6,816,894 B1    11/2004 Philyaw
                (Continued)

FOREIGN PATENT DOCUMENTS

CN       110161488 A     8/2019
DE    102018114852 A1   12/2019
            (Continued)

OTHER PUBLICATIONS

Lin, Ming et al. "Self-Driving Car Location Estimation Based on a Particle-Aided Unscented Kalman Filter." Sensors (Basel, Switzerland) vol. 20,9 2544. Apr. 29, 2020, doi:10.3390/s20092544 (Year: 2020).*
First Office Action for Chinese Patent Application No. 202210168972. 6, mailed Jan. 17, 2024, 23 pages.
(Continued)

*Primary Examiner* — Matthew C Bella
*Assistant Examiner* — Janice E. Vaz
(74) *Attorney, Agent, or Firm* — Withrow & Terranova, PLLC (57) ABSTRACT

A maneuvering assistant system for a vehicle combination comprising an interface configured to receive measurements from a camera, processing circuitry implementing a Kalman filter configured to observe an articulation angle of the vehicle combination on the basis of the measurements from the camera, a signal analyzer configured to repeatedly estimate a signal noise of the camera measurement and to adjust the Kalman filter on the basis of statistics derived from the estimated signal noise, and an assistance unit configured to receive an estimate of the articulation angle from the Kalman filter and provide drive actions based on the estimate.

18 Claims, 5 Drawing Sheets

(51) Int. Cl.
| | |
|---|---|
| *B60W 30/18* | (2012.01) |
| *B60W 60/00* | (2020.01) |
| *G06T 7/277* | (2017.01) |
| *G06T 7/70* | (2017.01) |
| *G06V 20/56* | (2022.01) |

(52) U.S. Cl.
CPC ........... *B60W 60/001* (2020.02); *G06T 7/277* (2017.01); *G06T 7/70* (2017.01); *G06V 20/56* (2022.01); *B60W 2300/145* (2013.01); *B60W 2420/403* (2013.01); *B60W 2520/22* (2013.01); *G06T 2207/30252* (2013.01)

(58) Field of Classification Search
CPC ....... B60W 2420/403; B60W 2520/22; B60W 2050/0059; B60W 2050/0088; G06T 7/277; G06T 7/70; G06T 2207/30252; G06V 20/56; G06V 10/98
See application file for complete search history.

(56) References Cited

U.S. PATENT DOCUMENTS

| | | | |
|---|---|---|---|
| 2002/0042668 | A1 | 4/2002 | Shirato et al. |
| 2014/0358417 | A1* | 12/2014 | Lavoie .................. B60K 35/10 701/300 |
| 2015/0276783 | A1* | 10/2015 | Palella .................. G01P 1/006 702/141 |
| 2016/0349362 | A1 | 12/2016 | Rohr et al. |
| 2019/0009815 | A1* | 1/2019 | Lavoie .................. B62D 13/06 |
| 2019/0235504 | A1 | 8/2019 | Carter et al. |
| 2021/0170947 | A1* | 6/2021 | Yunus ..................... B60R 1/26 |
| 2022/0161782 | A1* | 5/2022 | Laine ............... B60W 50/0097 |

FOREIGN PATENT DOCUMENTS

| | | |
|---|---|---|
| EP | 2997429 A1 | 3/2016 |
| EP | 3291137 A1 | 3/2018 |
| FR | 2938228 A1 | 5/2010 |
| JP | 2013125327 A | 6/2013 |

OTHER PUBLICATIONS

Akhlaghi, S. et al., "Adaptive Adjustment of Noise Covariance in Kalman Filter for Dynamic State Estimation," 2017 IEEE Power & Energy Society General Meeting, Jul. 16-20, 2017, Chicago, IL, USA, IEEE, 5 pages.

Hajiyev, C., "Adaptive filtration algorithm with the filter gain correction applied to integrated INS/radar altimeter," Proceedings of the Institution of Mechanical Engineers, vol. 221, Part G: Journal of Aerospace Engineering, May 1, 2007, IMechE 2007, pp. 847-855.

Hu, C. et al., "Adaptive Kalman Filtering for Vehicle Navigation," Journal of Global Positioning Systems, vol. 2, No. 1, Jun. 2003, CPGPS, pp. 42-47.

Nilsson, P. et al., "Single-track models of an A-double heavy vehicle combination," Technical Reports in Applied Mechanics, Report 2013:08, Chalmers University of Technology, Goteborg, Sweden, 2013, 28 pages.

Odelson, B.J. et al., "A New Autocovariance Least-Squares Method for Estimating Noise Covariances," Technical report No. 2003-04, Texas-Wisconsin Modeling and Control Consortium, Sep. 1, 2003, 13 pages.

Zhang, Q. et al., "Noise Adaptive Kalman Filter for Joint Polarization Tracking and Channel Equalization Using Cascaded Covariance Matching," IEEE Photonics Journal, vol. 10, No. 1, Feb. 2018, IEEE Photonics Society, 12 pages.

Extended European Search Report for European Patent Application No. 21160007.7, mailed Jun. 28, 2021, 7 pages.

Second Office Action for Chinese Patent Application No. 202210168972.6, mailed Apr. 10, 2024, 23 pages.

* cited by examiner

LOW-SPEED MANEUVERING ASSISTANT FOR A VEHICLE

TECHNICAL FIELD

The present application claims priority to European Patent Application No. 21160007.7, filed on Mar. 1, 2021, and entitled "LOW-SPEED MANEUVERING ASSISTANT FOR A VEHICLE," which is incorporated herein by reference in its entirety.

FIELD OF THE DISCLOSURE

The present disclosure relates to the field of vehicular control and in particular to a maneuvering assistant for a vehicle combination.

BACKGROUND

It is a challenging task even for an experienced driver to maneuver a commercial heavy vehicle combination safely and efficiently, especially when the vehicle combination is to be reversed in a spatially constrained area, such as a loading bay, industrial environment, historic street network, mine etc. Different assistive systems, termed low-speed maneuvering assistants, have been proposed and implemented. Designers of such systems frequently face difficulties related to the fluctuating availability of reliable vehicle sensor data, which may differ when the vehicle is operated in different ways (e.g., speed, load, condition of sensors) or environmental factors change (e.g., visibility, road friction coefficient, sidewind).

To mention one example, the application published as US2019009815A1 discloses a trailer backup assist system for a vehicle reversing a trailer. The system is guided by a filtered hitch angle (articulation angle) $\gamma$, which a Kalman filter estimates on the basis of vehicle and trailer speed signals $v_1$, $v_2$ and of yaw rate sensor signals $\omega_1$, $\omega_2$. In normal operation, the Kalman filter repeatedly performs an update step, in which the filter's prediction $\hat{\gamma}(k)$ of the hitch angle is compared to a value $\gamma(k)$ derived from measurements. The update step includes a correction of the filter's internal state variables if necessary. Because the kinematic relations between the hitch angle $\gamma$ and the kinematic sensor signals $v_1$, $v_2$, $\omega_1$, $\omega_2$ become unstable (singular) at low speed, the Kalman filter may temporarily enter a low-speed mode in which the latest good estimate is frozen, as per $$\hat{\gamma}(k+1)=\hat{\gamma}(k),$$

or in which the hitch angle is extrapolated without proper updating as $$\hat{\gamma}(k+1)=\hat{\gamma}(k)+(\omega_2(k)-\omega_1(k))T_s,$$

where $T_s$ is a sampling interval. The system according to US2019009815A1 may be amenable to have a balanced and practically useful behavior, e.g., if its internal parameters are carefully tuned before deployment. Yet, if the system is used in a vehicle that frequently drives a low speed, it is not unlikely to produce a significant amount of artifacts due to the many abrupt shifts between low-speed mode and normal mode that such driving necessitates.

SUMMARY

One objective of the present disclosure is to make available a method for assisting maneuvering of a vehicle combination in which the articulation angle is estimated by a uniform approach. It is a further objective to propose a maneuvering assistant system including an articulation angle estimator which transfers between different operating regimes in a continuous or quasi-continuous fashion. It is a particular objective to propose an articulation angle estimator, which is suited for use in a maneuvering assistant system and which transfers between operating regimes when this is likely to improve accuracy but avoids such transfers otherwise.

These and other objectives are achieved by the invention as defined by the independent claims. The dependent claims relate to advantageous embodiments.

In a first aspect of the invention, there is provided a method for assisting maneuvering of a vehicle combination. The method comprises: initiating a Kalman filter which observes an articulation angle $\phi$ of the vehicle combination and which is fed with measurements from a camera; repeatedly estimating a signal noise of the camera measurement; adjusting the Kalman filter on the basis of statistics derived from the estimated signal noise; obtaining an estimate $\hat{\phi}$ of the observed articulation angle from the Kalman filter; and providing maneuvering assistance based on the estimate of the articulation angle.

In the present disclosure, the act of "repeatedly estimating a signal noise" refers to signal noise estimation which is performed in a repeated, recurrent, enduring, continuous, continual or persistent fashion for as long as the method is being executed. This allows to capture fluctuations in the camera signal quality as they occur and, if deemed necessary, to take compensatory action. The estimation method as such does not need to be a continuous one, but may be based on sampling or intermittent sampling (bursts) of the camera signal. The phrase "repeatedly estimating a signal noise" however does not encompass a one-off estimation as this would merely provide a snapshot of the camera signal quality. The phrase also excludes signal noise estimation which is performed prior to deployment, e.g., in a prototype or testing phase, for this would not capture problems that the camera signal encounters during operation. As such, because the signal noise of the camera measurement is repeatedly estimated, the Kalman filter can be adjusted such that its quantitative properties adapt responsively when the camera signal quality varies. The quantitative properties of the Kalman filter represent a quasi-continuum of operating regimes, whereby sudden changes are avoided. This makes artifacts less likely to occur. As a result, the Kalman filter can provide a more accurate and/or reliable articulation angle estimate $\hat{\phi}$.

In some embodiments, the measurement noise covariance (denoted R herein) of the Kalman filter is adjusted in accordance with the camera signal noise statistics. An adjustment of the measurement noise covariance may cause a gain of the Kalman filter to change. In a further development, a maximum value of the measurement noise covariance is applied when the system detects a signal fault of the camera measurement. The maximum value of the measurement noise covariance may be applied for as long as the fault is present, upon which the system reverts to adjusting the measurement noise covariance on the basis of camera signal noise statistics.

In some embodiments, the Kalman filter is a nonlinear Kalman filter, such as an extended Kalman filter (EKF), an unscented Kalman filter (UKF) or an ensemble Kalman filter. These filters can be combined with nonlinear vehicle models. The term "Kalman filter" also extends to filters with an equivalent functioning, such as information filters or inverse covariance filters.

In a second aspect of the invention, there is provided a maneuvering assistant system for a vehicle combination. The system comprises: an interface configured to receive measurements $z_1$ from a camera; processing circuitry implementing a Kalman filter configured to observe an articulation angle $\phi$ of the vehicle combination on the basis of the measurements from the camera; a signal analyzer configured to repeatedly estimate a signal noise of the camera measurement and to adjust the Kalman filter on the basis of statistics derived from the estimated signal noise; and an assistance unit configured to receive an estimate $\hat{\phi}$ of the articulation angle from the Kalman filter and provide drive actions u based thereon.

The invention further relates to a computer program containing instructions for causing a computer, or the maneuvering assistant system in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

The term "vehicle combination", in its broad meaning in this disclosure, encompasses any of a combination vehicle, a tractor-trailer and a road train. The problem of estimating an articulation angle $\phi$ also arises in articulated vehicles (for which a tractor-trailer partition may not be discernable and/or where the vehicle units may be permanently coupled) and can be efficiently solved by the technical measures proposed herein. Articulated vehicles of this type include articulated construction equipment and articulated passenger vehicles. For the purposes of the present disclosure, such vehicles constitute "vehicle combinations". In specific embodiments, the term "vehicle combination" is given the stricter meaning of a combination of one powered (driven) vehicle unit and one or more non-powered vehicle units, wherein the powered vehicle may be a conventional or autonomous vehicle. The units making up a "vehicle combination" in this stricter sense are unable of operating as a vehicle combination while they are in the decoupled state, as opposed to powered vehicle units with a platooning capability.

As used herein, a "camera" refers to an imaging device which is operable to use visible or invisible light to produce a still or moving image (image stream). The camera may be an arrangement of imaging devices (e.g., stereo camera) or a combination of an imaging device and a supplementary sensor, such as a depth-indicating sensor, whereby the image may contain depth information, e.g., in the form of a point cloud.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
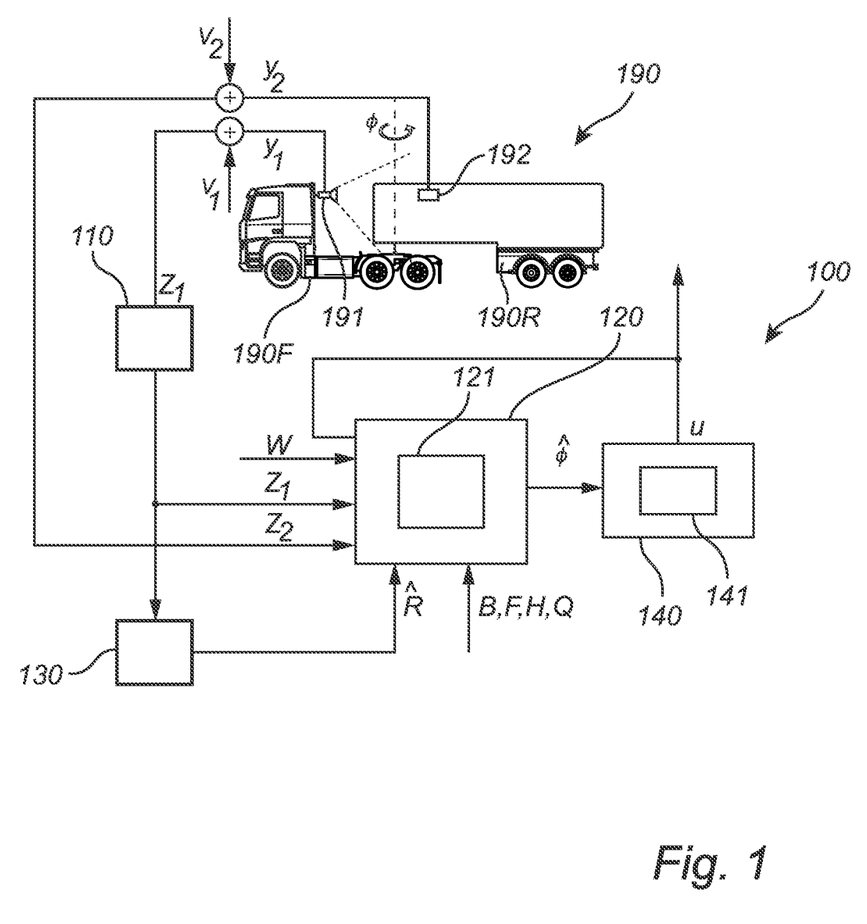
FIG. 1 shows a two-unit vehicle combination equipped with a camera (upper part) together with a maneuvering assistant system comprising a Kalman filter and a signal analyzer for adjusting the Kalman filter based on estimated camera signal noise (lower part)

FIG. 1 shows a vehicle combination 190 consisting of a tractor 190F and a trailer 190R, and the vehicle combination 19o is associated with a maneuvering assistant system 100. The maneuvering assistant system 100 may be installed onboard one of the vehicle units of the vehicle combination 190 or in an external fixed or moving location, or it may be implemented with networked processing support ('cloud' resources). The maneuvering assistant system 100 may have at least the following principal functional units: a signal interface 110, processing circuitry 120 implementing a Kalman filter 121, a signal analyzer 130 and an assistance unit 140.

Figure 3:
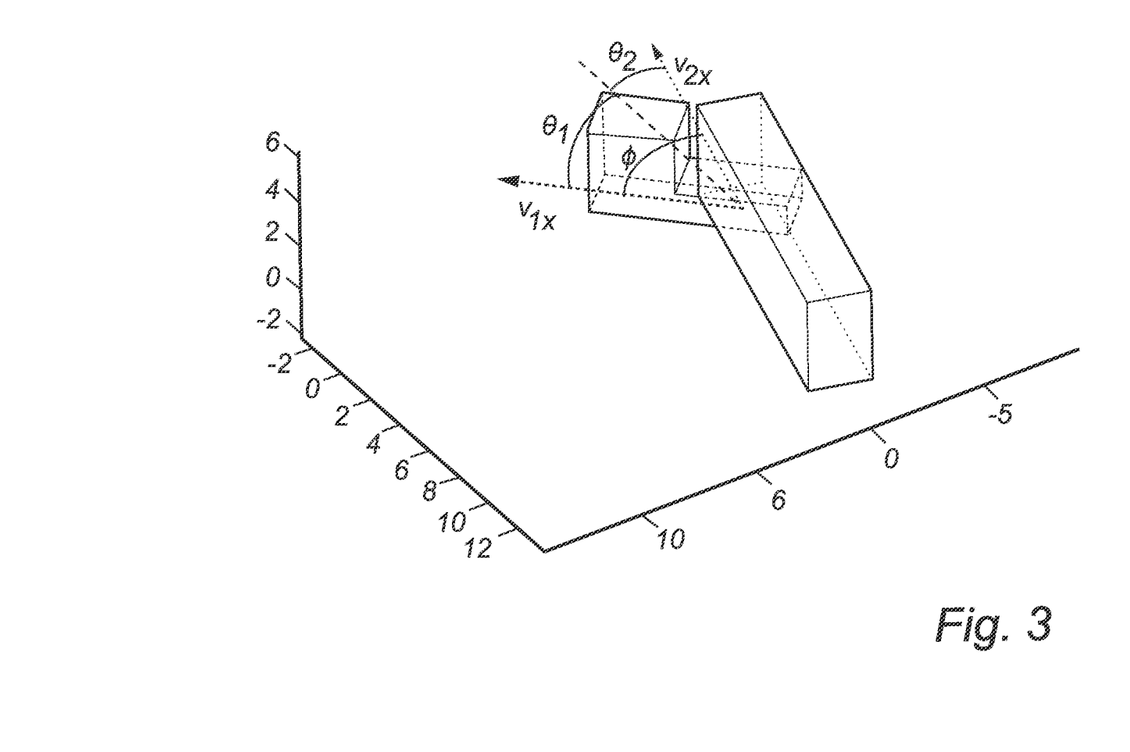
FIG. 3 is a schematic drawing of a two-unit vehicle combination with respective momentary longitudinal speeds $v_{1x}$, $v_{2x}$, yaw angles $\theta_1$, $\theta_2$ and articulation angle $\phi$ indicated.

In the vehicle combination 190, a camera 191 is arranged to image a view of the tractor 190F or the trailer 190R or both, based on which an articulation angle $\phi$ can be determined. As illustrated in more detail in FIG. 3, the articulation angle $\phi$ of the vehicle combination 190 may be understood as the difference between the respective yaw angles $\theta_1$, $\theta_2$ of the vehicle units, which angles represent absolute orientations with respect to a non-rotating reference frame. The orientation of each vehicle unit may be defined as the (yaw) orientation of its longitudinal axis, with which the longitudinal component $v_{1x}$, $v_{2x}$ of its velocity is aligned.

Figure 4:
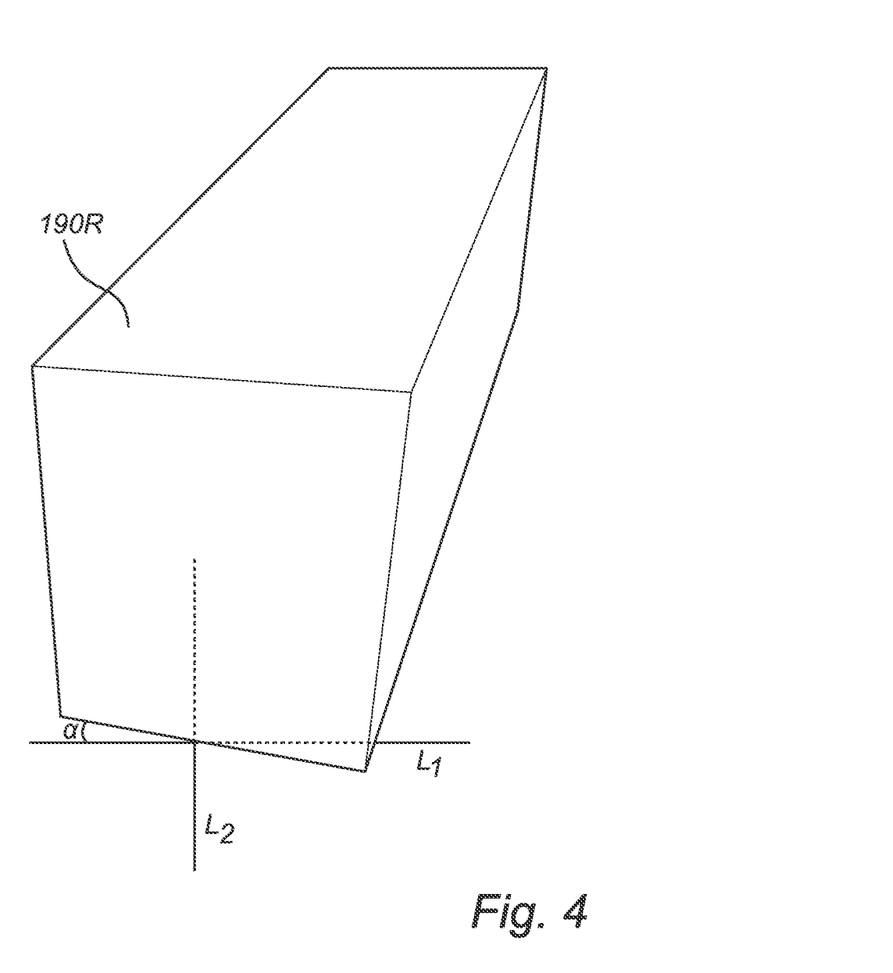
FIG. 4 shows a trailer front side as viewed from a tractor-mounted camera.

The camera 191 may be mounted on the tractor 190F and be directed towards the trailer 190R. For example, the camera 191 may be mounted on the rear side of the driver cab, as suggested by FIG. 1, or after the rear axle of the tractor 190F approximately 1 m above ground level, or after the rearmost axle of the tractor 190F ahead of the articulation point. When the camera 191 is mounted on the rear side of the driver cab, its view may be similar to that shown in FIG. 4, where the front face of the trailer 190R during a left turn (non-zero articulation angle) is seen. It is seen in FIG. 4 that the front face of the trailer 190R deviates by an angle $\alpha$ from the horizontal axis $L_1$ whereas it remains aligned with the vertical axis $L_2$. Relevant elements may be identified in the camera image by feature tracking. From the angle $\alpha$, the articulation angle $\phi$ can be determined on the basis of a theoretical or empirical relation. To be precise, knowledge of the angle α allows the determination of a yaw component of the articulation angle ϕ, which is the main focus of the present disclosure. Some embodiments may additionally include a determination of a pitch component of the articulation angle; image data on which such determination can be based may be obtained from a camera with a similar or modified placement and/or by arranging suitable optical markers (fiducials) on the vehicle combination 190 and/or relying on depth data. As an alternative to mounting on the tractor 190F, the camera 191 may be mounted on the trailer 190R and capture the rear side of the tractor 190F. Further, the camera 191 may be of a wide-angle type and arranged to capture the tractor 190F and trailer 190R in a common scene, whereby the relative position and orientation can be inspected visually. The signal interface 110 of the maneuvering assistant system 100 receives the measurements $z_1$ from the camera 191.

The vehicle combination 190 may include at least one further sensor 192 supplying the maneuvering assistant system 100 with measurement data. The further sensor 192 may be a fifth-wheel sensor for direct measurement of the articulation angle ϕ, an inertial position or orientation sensor, a global navigation satellite system (GNSS) receiver, a torque sensor, wheel speed or position sensor, or a steering angle sensor. Further still, the further sensor 192 may be arranged to observe control signals $u_{driver}$ which the driver provides manually to the driveline of the tractor 190F or to other relevant actuators in the vehicle combination 190.

The assistance unit 140 is configured with a vehicle model that describes the vehicle combination 190 and can be utilized to determine drive actions u (e.g., acceleration/braking signals, steering angle signals, and other commands directed to the driveline of the tractor 190F or to other relevant actuators in the vehicle combination 190) for causing the vehicle combination 190 to move as desired or for helping a human driver to maneuver the vehicle combination 190 as desired. The assistance unit 140 may be configured primarily for low-speed maneuvering assistance. The vehicle model in the assistance unit 140 may be an inverse model which maps desired movements (e.g., a forward or reverse path) to a sequence of drive actions. Alternatively, the vehicle model may be a forward model allowing the assistance unit 140 to simulate the effect of a tentative sequence of drive actions and to adjust these if necessary. For a description of a generic reversing assistant, reference is made to the applicant's patent EP2997429B1. The assistance unit 140 generates the drive actions u on the basis of a vehicle state estimated by the Kalman filter 121, including an estimate $\hat{\phi}$ of the articulation angle, and an operator's input (not shown) representing the desired movements of the vehicle combination 190.

Figure 5:
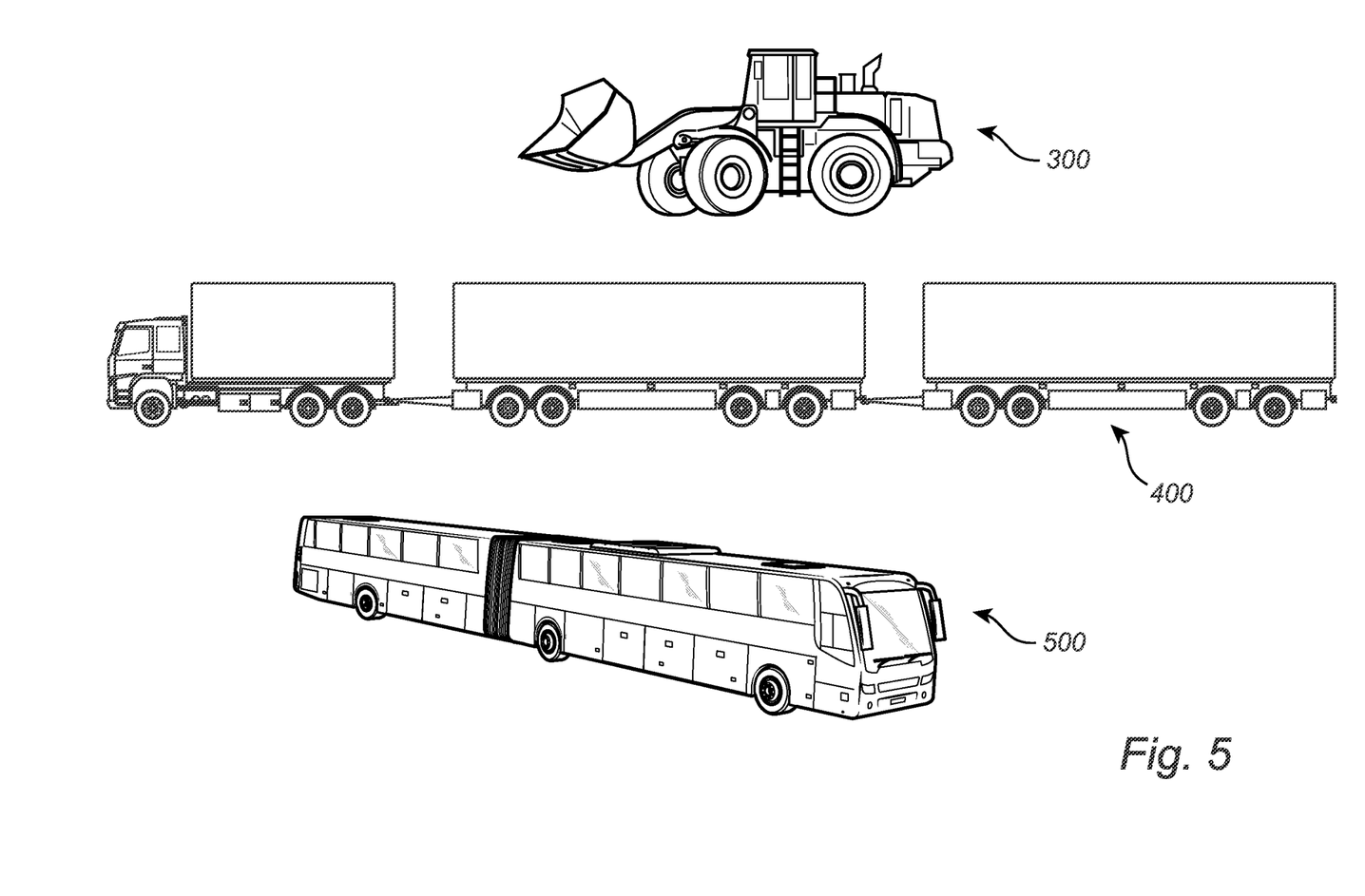
FIG. 5 shows an articulated construction equipment vehicle, a three-unit vehicle combination and an articulated passenger vehicle.

To illustrate a basic embodiment of the invention, a linear Kalman filter 121 implemented as software code to be executed in discrete time by the processing circuitry 120 will now be described. The Kalman filter 121 maintains a state $\hat{x}$ which estimates the true state x of the vehicle combination 190. The true state x is assumed to evolve with time as:

$$x(k)=Fx(k-1)+Bu(k)+w(k),$$

where F is a state-transition model matrix (optionally time-dependent), B is a control-input model matrix (optionally time-dependent), u(k) is the drive-action signal at time k, and w(k) is process noise assumed to have normal distribution with covariance Q and zero mean. The state x may have one or more components, one of which may be the articulation angle ϕ. Alternatively, the articulation angle ϕ may be derivable from the state x. Further components of the state x may be position, velocity, steering angle, a pitch component of the articulation angle and—in the case of a three-unit vehicle combination 400 (FIG. 5)—a further articulation angle. It is moreover assumed that an observation z(k) of the true state is given by $$z(k)=Hx(k)+v(k),$$

where H is an observation model matrix and v(k) is measurement noise likewise assumed to be normally distributed with covariance R (measurement noise covariance) and zero mean. The measurement noise covariance matrix R is diagonal if the noise terms are uncorrelated. As indicated in FIG. 1, the measurement vector z(k) at least includes a signal $z_1(k)$ from the camera 191 and a signal $z_2(k)$ from the further sensor(s) 192. The camera signal $z_1(k)$ is assumed to include not only the true measurement $y_1(k)$ but also a noise term $v_1(k)$; the further sensor signal $z_2$ is modeled similarly.

The Kalman filter 121 is configured to evolve the estimated state $\hat{x}$ according to the following prediction operation:

$$\hat{x}(k|k-1)=F\hat{x}(k-1|k-1)+Bu(k),$$

that is, the a posteriori state estimate at time k given observations up to time k−1 is computed from the previous state estimate $\hat{x}(k-1|k-1)$ and the drive-action signal u(k). The measurement signal z is fed to the Kalman filter 121 via an update operation:

$$\hat{x}(k|k)=\hat{x}(k|k-1)+K(k)\tilde{y}(k),$$

where the so-called innovation $\tilde{y}$ is given by $$\tilde{y}(k)=z_k-H\hat{x}(k|k-1).$$

According to Kalman filter theory, the optimal value of the Kalman gain K(k), to be used in the update operation, is:

$$K(k)=P(k|k-1)H^T S(k)^{-1},$$

where the predicted estimate covariance $$P(k|k-1)=FP(k-1|k-1)F^T+Q,$$

$H^T$ is transpose of H, and the innovation covariance $$S(k)=HP(k|k-1)H^T+R.$$

As indicated in FIG. 1, the Kalman filter 121 is fed with approximate values of the matrices B, F, H, Q. These values, which may have been determined in a prototype, tuning or testing phase prior to commercial deployment (e.g., using an Autocovariance Least-Squares or a Field Kalman Filter algorithm), would generally be maintained unchanged during operation. According to some embodiments herein, however, at least one component of the measurement noise covariance R is repeatedly estimated. For this purpose, the signal analyzer 130 downstream of the signal interface 110 repeatedly estimates the covariance $\hat{r}_{11}$ of the noise $v_1$ included the camera signal $z_1$. On this basis, if the noise terms $v_1$, $v_2$ are assumed to be uncorrelated, the signal analyzer 130 may estimate the measurement noise covariance matrix as $$\hat{R} = \begin{bmatrix} \hat{r}_{11} & 0 \\ 0 & r_{22} \end{bmatrix},$$

where $r_{22}$, which relates to the further sensor 192, may have been estimated prior to commercial deployment and be maintained unchanged during operation, similar to matrices B, F, H, Q. In some embodiments, the signal analyzer 130 may estimate a different statistical indicator, such as standard deviation, variance, range, interquartile range—e.g. using a specialized chipset which is optimized for such estimation—which is subsequently converted into the measurement noise covariance matrix estimate $\hat{R}$.

For either one of these estimates, the notation $\hat{R}(k)$ may be used, which is intended to signify that a new value may be assigned to the measurement noise covariance matrix estimate every epoch k; it not to be taken to mean that epoch-wise updating is an essential feature of the present invention. The estimate $\hat{R}(k)$ is fed to the Kalman filter 121 in addition to these matrices, which causes the innovation covariance S(k) to change as per $$S(k)=HP(k|k-1)H^T+\hat{R}(k),$$

which in turn adjusts the Kalman gain K(k). Because the Kalman gain K(k) has an inverse dependence on $\hat{R}(k)$, an increase of the estimated covariance $\hat{r}_{11}$ will decrease the camera signal's $z_1$ influence on the updated state $\hat{x}(k|k)$. A covariance increase may signify that the camera signal $z_2$ has become noisier; the inventor has realized that this may correspond to poor sensor conditions, such as camera lens reflections at low sun angle, ambient light outside design range etc., which are likely to corrupt the camera signal $z_1$ or render it invalid. Rather than relying excessively on the camera signal $z_1$ in such conditions, the Kalman filter 121 will put more trust in the prediction operation reflecting the state model, thereby marginally approaching a dead-reckoning setup for those components of the state x that are normally updated on the basis of the camera signal $z_1$. Conversely, a relatively noise-free camera signal will be given significant weight when the Kalman filter state $\hat{x}(k|k-1)$ is to be updated into $\hat{x}(k|k)$. Accordingly, the quantitative properties of the Kalman filter 121 adapt responsively when the camera signal quality varies. Because a change in $\hat{R}(k)$ affects the next increment of the updated state $\hat{x}(k|k)$ rather than the state itself, the Kalman filter 121 operates uniformly and stably. Further, because the measurement noise of the camera 191 is directly related to the estimation accuracy, each adjustment of the Kalman gain is fully justified.

The Kalman gain indicated above is optimal in the sense that it minimizes the residual error. There exist further strategies for setting the Kalman gain in given circumstances F, H, Q, R, to improve the state estimation quality in various regards, e.g., by reducing a statistical variability measure of the estimated state. The above-described technique, of performing a continuous estimation on the noise of the camera signal $z_2$, remains applicable also in combination with these alternative strategies for setting the Kalman gain K(k). Generally, the measurement noise matrix estimate $\hat{R}(k)$ may be substituted for all occurrences of the measurement noise matrix R in the basic version of these strategies, whereby the quantitative properties of the Kalman filter 121 are updated in a controlled fashion.

Other embodiments may employ a nonlinear vehicle model. A nonlinear kinematic model of a vehicle combination 190 at variable speed is described in P. Nilsson et al., "Single-track models of an A-double heavy vehicle combination", *Technical reports in Applied Mechanics* 2013:08, Chalmers University of Technology (2013). The same report also describes an approximate linear model for constant speed, which may be used with the above-described embodiment with the standard Kalman filter. In embodiments where a nonlinear model is preferred, an extended Kalman filter may be used, in which matrices F, H are replaced with general functions $f$, h. It suffices to modify the above equations in to a new prediction operation: $\hat{x}(k|k-1)=f(\hat{x}(k-1|k-1),u(k))$,
and innovation: $\tilde{y}(k)=z(k)-h(\hat{x}(k|k-1))$, and the matrices F, H in the Kalman gain and predicted estimate covariance are replaced by the Jacobians $$F(k) = \frac{\partial f}{\partial x}\bigg|_{\hat{x}(k-1|k-1),u(k)}$$

$$H(k) = \frac{\partial h}{\partial x}\bigg|_{\hat{x}(k|k-1)}$$

which represent a linearization at the predicted state of the Kalman filter. Substituting these Jacobians into the basic expressions, the Kalman gain changes into $$K(k) = P(k|k-1)H(k)^T S(k)^{-1} =$$
$$[F(k)P(k-1|k-1)F(k)^T + Q]H(k)^T[H(k)P(k|k-1)H(k)^T + \hat{R}(k)]^{-1}.$$

In variations of the present embodiment, an unscented Kalman filter or an ensemble Kalman filter may be used.

As seen above, the linearization in itself causes H, K to be time-dependent quantities. It is furthermore possible to use time-dependent functions $f=f(\bullet,\bullet,k)$, $h=h(\bullet,k)$ to model the system, which produces modified prediction operation: $\hat{x}(k|k-1)=f(\hat{x}(k-1|k-1),u(k),k)$,
and innovation: $\tilde{y}(k)=z(k)-h(\hat{x}(k|k-1),k)$.

In one embodiment, the signal analyzer 130 is configured with a dedicated functionality or dedicated software routine for detecting a signal fault affecting the signal path from the camera 191. A signal fault may correspond to a hardware failure (e.g., cables, switches, interfaces), a software execution failure or communication failure during runtime, by which the camera signal $z_1$ does not reach the signal interface 110 in an orderly fashion. The camera signal $z_1$ may for example take values outside the defined range. In addition to the camera signal $z_1$ itself, there may exist observable secondary indicators such as network health status parameters allowing to conclude a signal failure. In this case the signal analyzer 130 may be configured to not attempt to estimate the covariance of the signal that it receives (or wait for the signal to reappear), but rather apply a maximum value of the measurement noise covariance for as long as the signal fault is detected. This may include setting $\hat{r}_{11}=r_{max}$, where $r_{max}$ is the largest (float) number that can be represented in the processing circuitry 120. Conceptually, the signal analyzer 130 may be adapted to set $\hat{r}_{11}=\infty$, whereby $S^{-1}=0$ and thus K(k)=0. If the Kalman filter 121 maintains a state component $\hat{x}_j(k)$ that is updated only on the basis of the camera signal $z_1$, the zeroing of the corresponding element of the Kalman gain matrix K (k) (position (j,1)) will cause $\hat{x}_j(k)$ to be predicted on a pure dead-reckoning basis. The signal analyzer's 130 transfers into and out of the emergency mode in response to a signal fault does not in themselves imply a sudden change in the state maintained by the Kalman filter 121.

Figure 2:
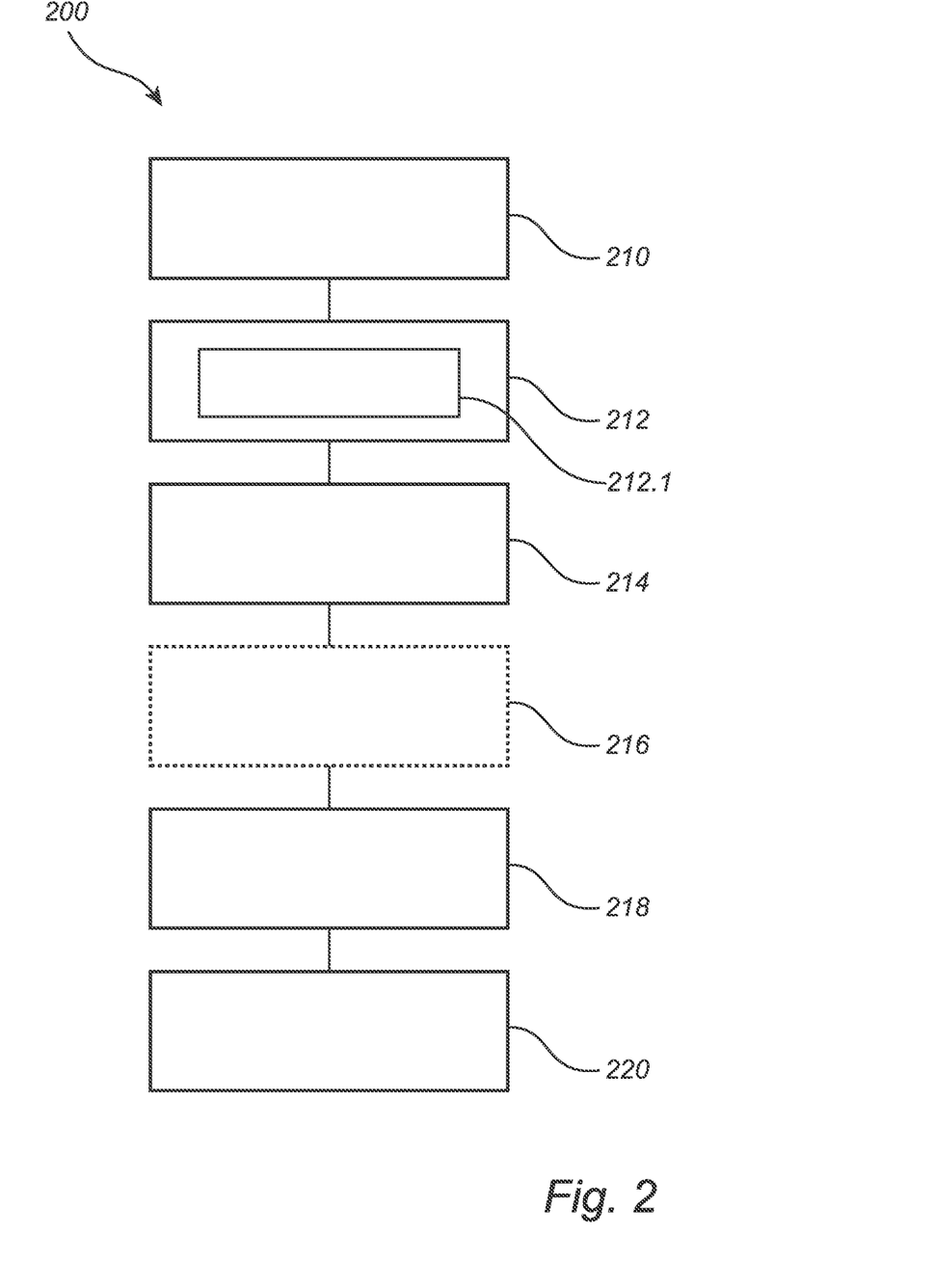
FIG. 2 is a flowchart of a method for assisting the maneuvering of a vehicle combination.

FIG. 2 summarizes the above-described behavior of the maneuvering assistant system 100 as a method 200 for assisting maneuvering of a vehicle combination 190.

In a first step 210 of the method 200, a Kalman filter 121 which observes an articulation angle ϕ of the vehicle combination 190 and which is fed with measurements from a camera 191 is initiated. As explained above, the articulation angle ϕ may be a component of a state (variable) maintained by the Kalman filter 121, or it may be derivable from one or more other components of the state.

In a second step 212, the signal noise of the camera measurements is estimated in a continuous fashion. In a third step 214, the Kalman filter 121 is adjusted on the basis of statistics derived from the estimated signal noise. The statistics may include a covariance $\hat{r}_{11}$. Steps 212 and 214 may be repeated as long as needed, similar to the prediction and update operation of the Kalman filter 121 which serve to maintain the estimated state $\hat{x}$.

In a fourth step 216, a command is received from an operator (who may be a driver of the vehicle combination 190) to initiate maneuvering assistance. To effectuate this, in fifth and sixth steps 218, 220, the maneuvering assistant system 100 obtains an estimate $\hat{\phi}$ of the articulation angle from the Kalman filter 121 and provides maneuvering assistance based thereon, possibly by reference to a vehicle model.

FIG. 5 shows an articulated construction equipment vehicle (wheel loader) 300, a three-unit vehicle combination 400 and an articulated bus 500, each of which is understood to be a "vehicle combination" in the sense of the present disclosure.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisting maneuvering of a vehicle combination, comprising:
   initiating a Kalman filter which observes an articulation angle of the vehicle combination and which is fed with measurements from a camera;
   repeatedly estimating a signal noise of the camera measurements;
   adjusting the Kalman filter on the basis of statistics derived from the estimated signal noise;
   obtaining an estimate of the observed articulation angle from the Kalman filter; and
   providing maneuvering assistance based on the estimate of the articulation angle.

2. The method of claim 1, wherein the adjusting the Kalman filter comprises adjusting a Kalman filter parameter corresponding to measurement noise covariance.

3. The method of claim 2, wherein the adjusting includes adjusting a gain of the Kalman filter.

4. The method of claim 2, further comprising:
   detecting a signal fault of the camera measurement; and
   for as long as the signal fault is detected, applying a maximum value of the measurement noise covariance.

5. The method of claim 1, wherein the camera is located behind a rearmost axle of a vehicle ahead of an articulation point.

6. The method of claim 1, wherein the Kalman filter is fed with measurements from a sensor, and the Kalman filter is invariant with respect to signal noise of the further sensor.

7. The method of claim 1, wherein the maneuvering assistance includes low-speed maneuvering assistance.

8. The method of claim 7, wherein the low-speed maneuvering assistance includes autonomous reversing.

9. The method of claim 1, wherein the Kalman filter is a non-linear Kalman filter.

10. A non-transitory computer-readable medium comprising instructions which, when executed by a computer, cause the computer to:
    initiate a Kalman filter which observes an articulation angle of the vehicle combination and which is fed with measurements from a camera;
    repeatedly estimate a signal noise of the camera measurements;
    adjust the Kalman filter on the basis of statistics derived from the estimated signal noise;
    obtain an estimate of the observed articulation angle from the Kalman filter; and
    provide maneuvering assistance based on the estimate of the articulation angle.

11. The non-transitory computer-readable medium of claim 10, wherein the instructions executed by the computer, further causes the computer to adjust the Kalman filter parameter corresponding to measurement noise covariance.

12. The non-transitory computer-readable medium of claim 10, wherein the instructions executed by the computer further cause the Kalman filter to be fed with measurements from a sensor, and the Kalman filter is invariant with respect to signal noise of the further sensor.

13. The non-transitory computer-readable medium of claim 10, wherein the Kalman filter is a non-linear Kalman filter.

14. A maneuvering assistant system for a vehicle combination comprising:
    an interface configured to receive measurements from a camera;
    processing circuitry implementing a Kalman filter configured to observe an articulation angle of the vehicle combination on the basis of the measurements from the camera;
    a signal analyzer configured to:
      repeatedly estimate a signal noise of the camera measurement; and
      adjust the Kalman filter on the basis of statistics derived from the estimated signal noise; and
    an assistance unit configured to receive an estimate of the articulation angle from the Kalman filter and provide drive actions based on the estimate.

15. The maneuvering assistant system of claim 14, wherein the assistance unit is configured with a vehicle model representing the vehicle combination.

16. The maneuvering assistant system of claim 14, wherein the signal analyzer is configured to adjust the Kalman filter the basis of statistics derived from the estimated signal noise by being configured to adjust the Kalman filter parameter corresponding to measurement noise covariance.

17. The maneuvering assistant system of claim 14, wherein the interface is configured to receive the measurements from the camera is located behind a rearmost axle of a vehicle ahead of an articulation point.

18. The maneuvering assistant system of claim 14, wherein the Kalman filter is a non-linear Kalman filter.

* * * * *